MAGNETIC MEMORY SENSING SYSTEM

Filed June 17, 1960

INVENTORS
BRUCE C. FELTON
HARRY S. HOFFMAN, JR.
ANTHONY S. MARTELLO
Edgar H. Kent
ATTORNEY United States Patent Office 3,122,724
Patented Feb. 25, 1964

3,122,724

MAGNETIC MEMORY SENSING SYSTEM

Bruce C. Felton, Harry S. Hoffman, Jr., and Anthony S. Martello, Saugerties, N.Y., assignors to International Business Machines Corporation, New York, N.Y., a corporation of New York Filed June 17, 1960, Ser. No. 36,924
10 Claims. (Cl. 340—174)

This invention relates to digital computer error detection circuitry and more particularly to error detection circuitry adapted to supervise drive currents applied to magnetic memory devices and similar apparatus of the types employed in digital computers and other data processing machines.

Magnetic memory devices are commonly utilized in digital computer systems as a data storage means. In such systems the states of magnetization of individual magnetic elements are utilized to indicate information values. The information is written into or read out of the elements by means of a drive current of a predetermined magnitude being applied to the element. Both the amplitude and rise time of the drive current however must be accurately controlled and fall within certain predetermined limits or the information handling operation carried out as a result of that current will often be in error. The rise time of the current applied to magnetic memory elements in a read operation is particularly important. For example, in coincident current selection systems, if insufficient current is applied, a selected core may not switch or if the half select current is too large it may switch cores other than the selected ones, each result producing an erroneous output signal.

Accordingly, it is an object of this invention to provide an improved error checking means for supervising the application of drive currents to magnetic data storage apparatus.

Another object of the invention is to provide error detection circuitry for coincident current magnetic memory systems suitable for incorporation into data processing equipment as a part of error checking circuitry that will detect all single errors.

Another object of the invention is to provide in conjunction with a coincident current magnetic memory system a drive current error checking circuitry capable of providing an error signal when the magnitude of the drive current is outside the predetermined range of acceptable magnitudes.

Another object of the invention is to provide an improved drive current error checking circuitry suitable for use with magnetic matrix type of drive current generating means.

In accordance with the invention there is provided a magnetic memory drive current error detection system which in its preferred embodiment is particularly adapted to be associated with a coincident current type of magnetic data storage apparatus in which an actuating winding is inductively associated with each storage element. A drive current sensing element including a magnetic core having substantially linear magnetization characteristics with an output winding thereon is disposed relative to the drive lines of the actuating windings in a predetermined group so that half of these lines are inductively disposed relative to said sensing element in one sense and the other half of that group are disposed relative to said sensing element in the opposite sense. When one of the windings carries drive current sufficient to change the state of an associated storage element to effect a data transfer, the current flowing through the associated drive line induces, by transformer action, a voltage in the output winding of the sensing element proportional to the magnitude of the drive current. This voltage is applied to sensing means which provides an error signal when the voltage deviates from a predetermined range of acceptable values, thus providing an immediate indication of an erroneous amount of drive current. In the preferred embodiment the magnetic memory is arranged so that the actuating windings are connected through terminating resistors to an ungrounded common bus. The impedance values of the resistors and the bus are proportioned so that the drive current applied on one winding divides equally on the other drive lines for its return path. By means of a specific arrangement of the drive lines on the sensing element any adverse affect of this return current on the error detection system is substantially eliminated. This error detection system is also arranged to be insensitive to the cumulative effect of signals generated as the result of half select currents in certain types of drive conductor selection matrices. The error detection system of the invention thus provides accurate monitoring of drive currents applied to magnetic memory devices and is suitable for incorporation into a digital computer system designed to detect all single errors.

Other objects and advantages of the invention will be mentioned in the detailed description which follows. For a better understanding of the invention reference is made in the following description to the accompanying drawing in which.

Figures 1, 2, 3:
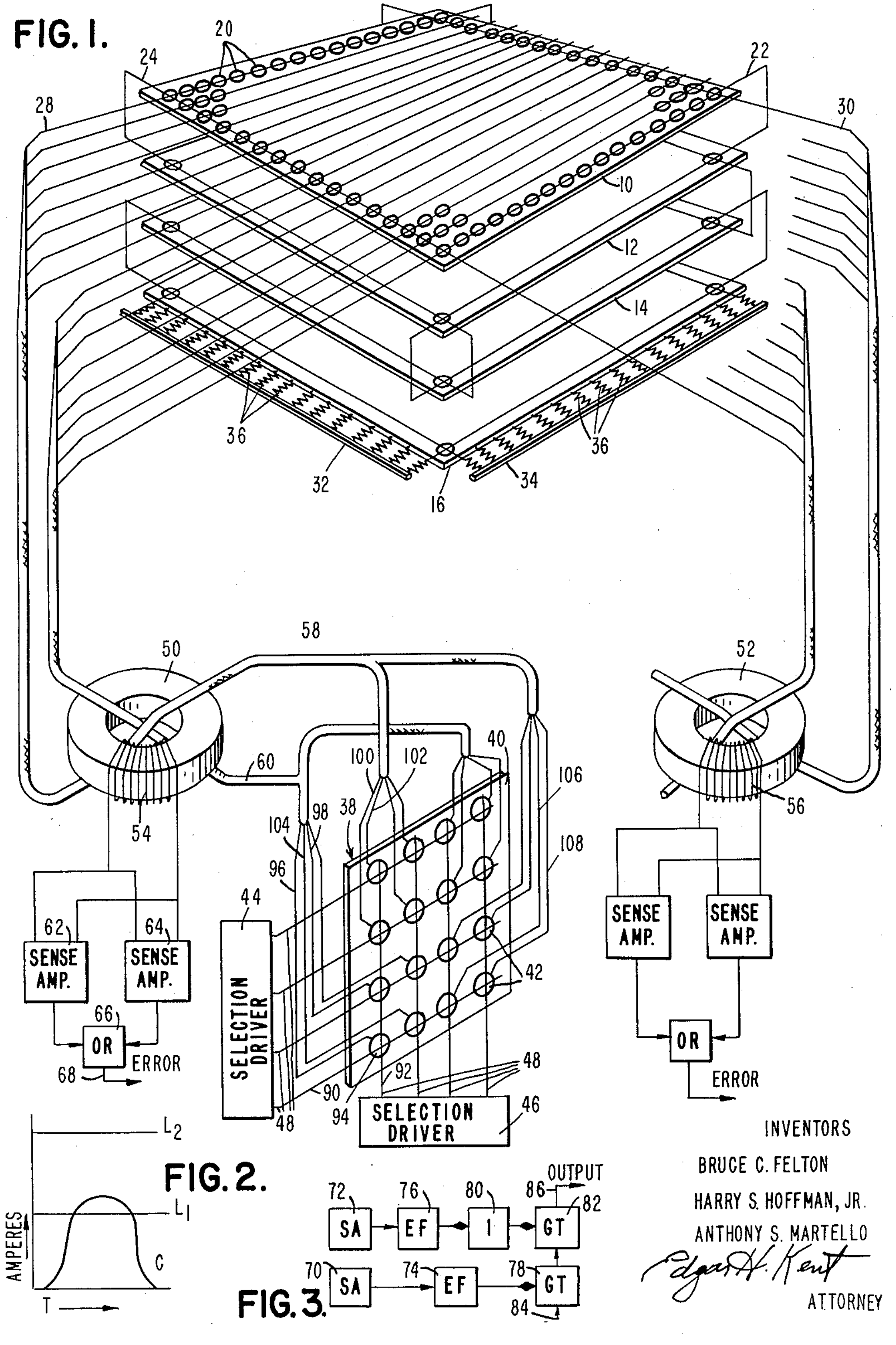
FIG. 1 shows in diagrammatic form the error checking circuitry of the invention associated with a three-dimensional coincident current magnetic memory in which the coincident selection currents are generated in a magnetic selection matrix.
FIG. 2 is a graphical representation of the drive current signal applied to the magnetic memory.
FIG. 3 is a logical block diagram of an alternative form of sensing means suitable for use in the error detection system of the invention.

In FIG. 1 a coincident current operated random access magnetic memory device is shown which comprises a plurality of memory planes, 10, 12, 14, 16. Each plane has a multiplicity of magnetic cores 20 of square loop material, which are arranged in a coordinate array, and through which are threaded in the conventional manner two sets 22, 24 of drive current windings which are used for selection purposes, and sense windings and inhibit windings. (As the sense and inhibit windings are well known, they are not shown in the drawing so that the drive current windings and their relationship to the memory device may be clearly appreciated.) Although the invention in its preferred embodiment is utilized in conjunction with magnetic memories in which there are fifty planes and the cores in each plane are arranged in a 128 x 128 configuration so that the memory is capable of storing 16,384 words of fifty bits each, it is believed that this simplified showing of the memory as having only four 16 x 16 planes with the requisite associated error detection circuitries will be sufficient to clearly teach the invention. Each conductor 28 associated with one set of drive windings 22 drives all the cores in a first vertical plane and each conductor 30 associated with the other group of drive windings 24 drives all the cores in a second vertical plane that is disposed perpendicularly to the cores in the first planes. The windings in each group are terminated in an ungrounded common bus, 32, 34 respectively, through terminating resistors 36 that are of equal value. The inductance of the bus 32, 34 is low in comparison with the impedance of the resistors 36 so that the drive current supplied on one drive line divides substantially evenly on all the other drive lines which provide the return paths for it. In operation a drive current is applied to one conductor of each group and a core in each plane at the intersection of those two energized planes is driven (unless inhibited) in the well known coincident current selection manner in an information transfer operation. As mentioned above, the return path for the drive current from each conductor is through the other conductors in the same group via the common bus 32, 34 and is applied to the other conductors substantially equally due to the impedance relationship between the bus and the terminating resistances 36.

A drive current conductor selection matrix 38 is associated with conductors 28. A similar matrix (not shown) is associated with conductors 30. The selection matrix 38 comprises a plane 40 of sixteen square loop magnetic cores 42 and operates on coincident current selection principles. There are two selection current drivers 44, 46 each having four drive lines 48 associated therewith. A storage element drive current conductor 28 is inductively associated with each core 42 in the selection matrix. When current is applied on one of the lines 48 from each selection driver 44, 46 the single core that is simultaneously subjected to current on two lines is switched and the resultant substantial flux change induces a voltage in the associated conductor 28 to produce drive current for application to the associated vertical plane of cores 20 in the magnetic memory. A wave form of the drive current C is indicated in the graph of FIG. 2. In order to provide proper switching of the cores it should have a magnitude above value $L_1$ but not above value $L_2$.

All the conductors 28, 30 respectively in each group are passed through a toroidal magnetic core 50, 52 respectively which has substantially linear magnetization characteristics and substantially no flux retentivity. An output winding 54, 56 on each core 50, 52 respectively has a voltage induced therein that is directly proportional to the drive current on the selected conductor in each group and this voltage provides an accurate indication of the drive current. However, during the selection process half select currents on the energized matrix drive lines 48 produce sufficient flux changes in the associated matrix cores 42 to cause current flow on certain conductors 28 which, although small, is sufficient to adversely affect the output signals from windings 54, 56. To overcome this difficulty one-half of the conductors 28 (indicated as cable 58) are passed through the sensing core in one sense and the other half of the conductors 28 (indicated as cable 60) are passed through the sensing core in the opposite sense. (The conductors 30 in the group associated with sensing core 52 are similarly arranged.) The conductors 28 in each cable are associated with matrix cores in a predetermined pattern, such that the effect of the currents generated on these conductors during the selection operation cancel in substantial measure and thus the effective current to which the sensing core is subjected is that of the drive current on the selected conductor only. The resultant flux change indicates a voltage in the output winding 54 on the core 50 which is applied to two sense amplifiers 62, 64. These sense amplifiers are respectively adjusted, by means of clipping levels, to be responsive to a maximum voltage (corresponding to $L_2$) and to a minimum voltage (corresponding to $L_1$) which define the range of permissible drive current values. If the drive current which induced the output voltage on winding 54 is outside of this range, an output is produced from one of the sense amplifiers and applied through diode OR circuit 66 to generate an alarm signal on line 68 indicating the error in the drive current. Similar sense amplifier and error signal circuitry is associated with output winding 56 on core 52.

An alternative form of sensing means is shown in FIG. 3 comprising voltage-amplifiers 70, 72, which are connected to the sensing core similarly to amplifiers 62, 64. The outputs of amplifiers 70, 72 are applied to emitter followers 74, 76 respectively. The output of emitter follower 74 is applied to gate 78 while the output of emitter follower 76 is applied through inverter 80 to gate 82. A sampling pulse on line 84 is applied to the gates serially and if both gates are conditioned an output signal will be provided on line 86. Amplifier 70 is responsive to voltages above the value corresponding to the level $L_1$ and amplifier 72 is responsive to voltages above the value corresponding to the level $L_2$. If the value of drive current C is above $L_1$ amplifier 70 will be actuated and apply a conditioning level to gate 78 and if that value is below $L_2$ the inverter 80 will have an output conditioning gate 82 as amplifier 72 is not actuated. As both gates are conditioned they will pass the sampling pulse as indicative that the proper magnitude of the drive current was applied to the memory. If, however, the drive current C is outside the range defined by $L_1$ and $L_2$ one of the gates will not be conditioned and the lack of an output pulse will indicate the error.

As an example of the operation of this error detection system, assume that matrix selection lines 90 and 92 are energized by the selection drivers so that core 94 is switched, producing a drive current on line 96. The half select currents on lines 90 and 92, however, produce small but not insignificant output signals on lines 98, 100, 102, 104, 106 and 108. As arranged in the drawing the lines 98 and 104 are grouped in the cable 60 which passes through the sensing core 50 in one direction and lines 100, 102, 106 and 108 are grouped in the cable 58 which passes through the sensing core in the other direction. Thus there is a substantial cancellation of the signals produced by the half select currents such that their effect on the accuracy of the signal applied to the sense amplifiers 62, 64 is minimized. It is obvious that the relationship between the selection matrix and output lines on the cables may be arranged so that complete cancellation would be achieved, by alternating the output lines so that the matrix cores are disposed relative to the two cables in a checkerboard arrangement, for example. The drive current on line 96, in addition to being applied to all the associated sensing cores 20, produces a substantial flux change in core 50 which induces a voltage in the output winding 54 that is applied to the sense amplifiers. If that voltage is not within the pre-established limits an output signal error is generated. The current on the selected drive line travels through the magnetic memory to its associated terminating resistor and the common bus 32 and then divides equally for return on the other fifteen conductors. Those other conductors are disposed in two groups, which pass through the sensing core 50 in opposite senses so that this return current does not produce a significant output voltage, seven-fifteenths of the drive current being on cable 60 and eight-fifteenths being on the cable 58. Thus the effective return current sensed by core 50 is of a magnitude that does not affect the proper operation of the error detection circuitry.

As mentioned above, the preferred embodiment of the invention is utilized in conjunction with a memory capable of storing 16,384 words of fifty bits each. With this memory the amplitude of the half-write currents employed is in the order of 585 miliamperes and 128 drive lines are associated with each dimension of the memory. These drive lines are passed through a sensing core which is a ferrite tape wound core Arnold type 5340–S 1. The output winding has one hundred turns.

It will be understood that various other circuit arrangements may be utilized in accordance with the invention. For example, the selection matrix may be an anti-coincidence or a load sharing (constantin) matrix rather than the coincident type illustrated in the drawing. The circuitry is also useful for observing the wave shape of the drive current signal in conjunction with a suitable oscilloscope which may be connected to the output winding of the sensing core in place of the sense amplifiers. Thus while there has been shown and described herein a preferred embodiment of the invention, it will be understood that the invention is not intended to be limited thereto or to details thereof, and departures may be made therefrom within the spirit and scope of the invention as defined in the claims.

We claim:

1. Error detection apparatus adapted to be associated with magnetic data storage means having a multiplicity of magnetic storage elements, each element having an actuating conductor inductively associated therewith, comprising a magnetic sensing element having a substantially linear magnetization curve, a group of said conductors inductively associated with said sensing element, half of said group of conductors being disposed relative to said sensing element in one sense and the other half of said group of conductors being disposed relative to said sensing element in the opposite sense, an output winding inductively associated with said sensing element, means for applying drive current to one of said conductors to effect a data transfer with the magnetic storage element associated with said conductor in said storage means, said drive current flowing through said conductor inducing, by transformer action, a voltage in the output winding associated with said sensing element, said voltage being proportional to the magnitude of said drive current, and means responsive to said voltage to provide an error signal when said voltage deviates from a predetermined range of acceptable values.

2. The apparatus as claimed in claim 1 wherein each of said conductors in said group has a terminating resistor associated therewith, said terminating resistors being connected to an ungrounded common bus, and having a large impedance value in comparison to the inductance of said common bus such that a return path for the drive current on the selected conductor is provided by all the other conductors, said conductors being disposed relative to said sensing element such that the effect of said return current as sensed by said sensing element is substantially canceled.

3. The apparatus as claimed in claim 1 wherein said drive current applying means includes a magnetic selection matrix comprising a plurality of bistable magnetic elements, each element being inductively associated with a single conductor of said group such that said drive current is generated as a result of the selection of a single magnetic element in said matrix, said matrix being divided into areas in accordance with the selection arrangement and said conductors being disposed relative to said sensing element so that currents other than the desired drive current generated during selection operations substantially completely cancel one another and do not adversely affect the drive current sensing operation.

4. The apparatus as claimed in claim 1 wherein said voltage responsive means includes first and second sensing amplifiers, one of said sense amplifiers being arranged to produce an output when the voltage applied thereto is below the lower limit of said range of acceptable values and the other amplifier being arranged to provide an output when the voltage is above the upper limit of said range of acceptable values, either output providing an indication of error in the magnitude of said drive current.

5. The apparatus as claimed in claim 1 wherein said voltage responsive means includes a first amplifier arranged to provide an output when the voltage is above the lower limit of said range of acceptable values, a second amplifier arranged to provide an output when the voltage is above the upper limit of said range of acceptable values and gating means responsive to said amplifier outputs arranged to provide a signal in response to a sampling pulse indicating that the proper magnitude of drive current has been applied to said magnetic data storage means.

6. Error detection apparatus adapted to monitor drive currents applied to a high speed magnetic memory having a multiplicity of magnetic data storage elements, each said storage element having two stable states, comprising two sets of storage element energizing conductors associated with said memory, said conductors in each set being arranged in two equal groups, a toroidal magnetic core having a substantially linear magnetization curve inductively associated with said conductors in each set, one group of conductors passing through said core in one direction and the other group passing through the associated core in the opposite direction, an output winding on each core, operating means for effecting a simultaneous excitation of one of said conductors in each set to produce drive current sufficient to change the state of the associated storage element in said memory for effecting a data transfer, said drive current flowing through each conductor inducing, by transformer action, a voltage in the output winding on the associated toroidal magnetic core, said voltage being proportional to the magnitude of said drive current, and means to sense said voltage.

7. The apparatus as claimed in claim 6 wherein each of said conductors has a terminating resistor associated therewith, the terminating resistors associated with each set of conductors being connected to an ungrounded common bus such that a return path for the drive current on the selected conductor is provided by all the other conductors in the associated set.

8. The apparatus as claimed in claim 6 wherein said operating means includes a magnetic selection matrix associated with each set of conductors, each said matrix comprising a plurality of bistable magnetic elements, and selection means associated with said matrix arranged in coincident current relationship therewith, each element being inductively associated with a single one of said conductors in the associated set and wherein said drive current is generated as a result of the selection of a single magnetic element in said matrix, said matrix being divided into areas in accordance with the selection arrangement and said conductors being threaded through said toroidal core so that minor signals generated during conductor selection operations substantially cancel one another and do not adversely affect the drive current sensing operation.

9. Drive current error detection apparatus for a high speed coincident current magnetic data storage device having a multiplicity of bistable magnetic storage elements arranged in a plurality of planes, comprising a plurality of storage element energizing conductors for supplying drive current to said storage elements, said conductors being arranged in two groups, each said conductor having a terminating resistor associated therewith, said terminating resistors associated with each group of conductors being connected to an ungrounded common bus, and having a large impedance value in comparison to the inductance of said common bus such that a return path for the drive current on a selected conductor is provided by all the other conductors in the group, each said storage element having an energizing conductor of each of said groups inductively associated therewith, a toroidal magnetic core having substantial linear magnetization characteristics inductively associated with each group of conductors, half of said conductors of each group passing through the associated core in one direction and the other half of each group passing through the associated core in the opposite direction, an output winding on each core, storage element selection means for effecting a simultaneous excitation of one conductor of each group to produce drive current in each conductor such that the resultant coincident current flow at selected storage elements is above the level necessary to change the stable states of said selected elements, said drive current flowing through one of said conductors inducing, by transformer action, a voltage proportional to the magnitude of said drive current in the output winding on each associated toroidal magnetic core, and first and second sense amplifiers responsive to said voltage, each said amplifier being arranged to provide an error signal when said voltage deviates in a preestablished direction from a predetermined voltage value.

10. The apparatus as claimed in claim 9 wherein said storage element selecting means includes a magnetic matrix comprising a plurality of magnetic elements associated with each group of conductors, each element of said matrix being inductively associated with a corresponding conductor of the group and coincident current matrix element selection means wherein drive current is generated as a result of the selection of a single magnetic element in said matrix, said matrix being divided into areas in accordance with said matrix element selection means and said conductors being threaded through each associated toroidal core so that matrix half-select currents produced during conductor selection operations cancel one another and do not affect the drive current sensing operation.

References Cited in the file of this patent

UNITED STATES PATENTS

| | | |
|---|---|---|
| 2,691,156 | Saltz | Oct. 5, 1954 |
| 2,719,965 | Person | Oct. 4, 1955 |
| 2,734,187 | Rajchman | Feb. 7, 1956 |
| 2,958,855 | Froggart | Nov. 1, 1960 |
| 3,011,165 | Angel et al. | Nov. 28, 1961 |
| 3,047,843 | Katz et al. | July 31, 1962 |